United States Patent [19]

Bredeson et al.

[11] 4,124,306
[45] Nov. 7, 1978

[54] VENT FOR DEVOLATILIZING SCREW PRESS

[75] Inventors: Dean K. Bredeson; Gregory C. Craig; William J. Gilius, all of Piqua; Charles R. Johnson, Akron, all of Ohio

[73] Assignee: The French Oil Mill Machinery Company, Piqua, Ohio

[21] Appl. No.: 856,104

[22] Filed: Nov. 30, 1977

[51] Int. Cl.² .................................................. B01F 11/00
[52] U.S. Cl. ......................................... 366/75; 366/89
[58] Field of Search .................................. 366/79–83, 366/89, 90, 168, 75; 159/2 E, 3; 34/9; 100/145, 117; 425/203, 207, 208

[56] References Cited

U.S. PATENT DOCUMENTS

| | | | |
|---|---|---|---|
| 3,684,252 | 8/1972 | Nissle et al. | 366/168 |
| 3,737,150 | 6/1973 | Otake | 366/75 |
| 3,781,132 | 12/1973 | Latinen | 366/75 X |
| 3,799,235 | 3/1974 | Moosavian et al. | 159/3 |
| 3,804,381 | 4/1974 | Bielfeldt | 366/89 |
| 3,985,348 | 12/1976 | Skidmore | 366/75 |
| 4,063,718 | 12/1977 | Koch | 366/75 |

Primary Examiner—Leonard D. Christian
Attorney, Agent, or Firm—Biebel, French & Nauman

[57] ABSTRACT

Apparatus for devolatilizing materials such as solvent containing polymers includes a cylindrical housing having inlet and discharge ends and a screw member rotatably mounted in the housing, operative to work material so as to release contained vaporizable substances from the material. An inlet fitting at the inlet end of the chamber is located opposite a part of the screw member. The housing includes a venting section extending therefrom at the inlet end and the screw member has a screw vent control section extending within the venting section, arranged to convey material toward the discharge end of the housing. A vent pipe is connected to the venting section for conducting away vaporized substances released from the material past the vent control section, and breaker bars cooperate with the vent control section of the screw member to clean from the screw member material tending to cling thereto and to clog the passage between the venting section and the screw vent control section, causing the particles of material to be carried back into the main flow of material from the inlet fitting toward the discharge.

3 Claims, 2 Drawing Figures

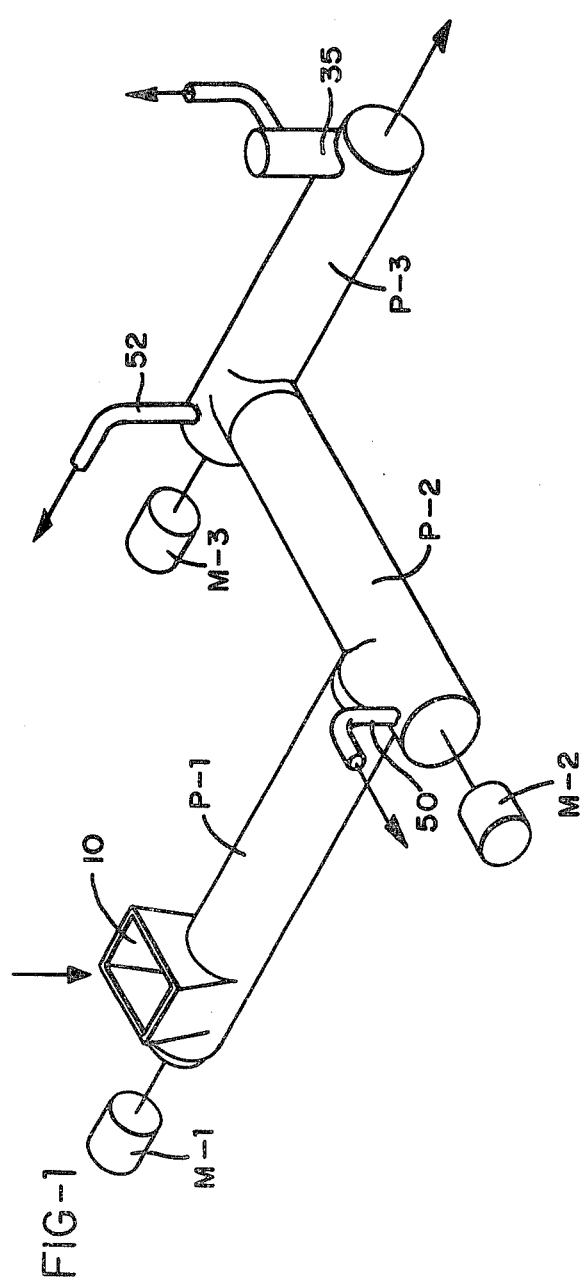
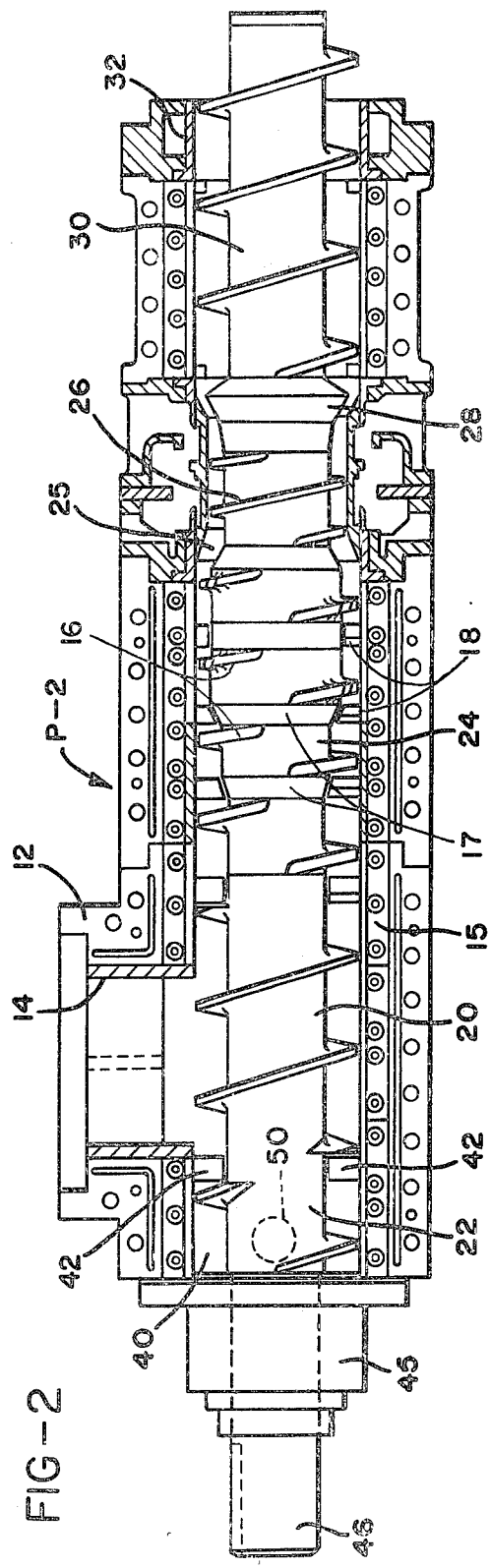
FIG-1
FIG-2

VENT FOR DEVOLATILIZING SCREW PRESS

BACKGROUND OF THE INVENTION

This invention relates to a screw press machine used to devolatilize various materials, e.g., elastomeric, thermoplastic, and the like, wherein the materials supplied to the press contain a significant quantity of some volatilizable substance, such as a hydrocarbon solvent, or water, and the material is mechanically worked and heated within the press, raising the substance to a temperature at which it will volatilize, whereupon the substance is released under some pressure as a gas or vapor, and is separated from the material and conducted away from the press.

A typical form of apparatus of this general type, particularly adapted for the removal of hydrocarbon solvents, is shown in U.S. Pat. No. 3,684,252 issued Aug. 15, 1972, to The French Oil Mill Machinery Company. A related U.S. Pat. No. 3,683,511 issued Aug. 15, 1972, to The Firestone Tire & Rubber Company, discloses and claims a method of removing volatile hydrocarbons from an elastomer, utilizing such equipment. A related patent, which deals in greater detail with the preparation and handling of the elastomer prior to its introduction into the screw press equipment is disclosed in U.S. Pat. No. 3,799,235 issued Mar. 26, 1974, also to The Firestone Tire & Rubber Company.

A venting system for equipment of this type, wherein the vent from the press is provided with a particular design of screw mechanism to control the exit flow of removed vapors, and to avoid entrainment therein of particles of material, is disclosed in U.S. Pat. application Ser. No. 856,103 filed concurrently herewith, entitled "Screw Vent", discloses a venting system for the regions of the press equipment where substantial quantities of the volatilizable substance have already been removed. The present invention deals with a simplified venting system for the upstream sections of the screw press apparatus, where initially larger quantities of the volatilizing substances are being removed, and wherein the handling of particles of the material, sometimes referred to as "fines," can be dealt with in somewhat different manner. At the same time, the substantial quantities of a volatilizable substance are removed in such a manner as to avoid the occurrence of unusually high vapor pressure within the press which might result in gasses passing by and damaging mechanical seals of the screw press shaft, thus leading to leakage of materials through those seals.

An extruder for concentrated polymers (30–80% polymer, 70–20% solvent by weight) is disclosed in U.S. Pat. No. 3,963,558 issued June 15, 1976, incorporating a so-called rear vent. This vent is located upstream of the inlet to the extruder from a concentrator via a screw conveyor, and is intended to vent solvent vapor through very shallow inter-flight spaces at the rear end of the extruder screw. However, the shallow space between the screw body, flight, and barrel tends to accelerate the outflow of venting vapors, and no provision is made to counteract the tendency of polymeric material to creep backward along the screw, and for particles of the material to be entrained in the venting vapors. This can quickly lead to deposits and/or clogging of the vent or a pipe extending from it, or can create a deposit and cleaning problem elsewhere if the vent and pipe pass the vapor entrained particles.

SUMMARY OF THE INVENTION

The present invention relates to a screw press having a venting system for volatilizable substances which are separated from material (such as an elastomer) being processed within the press, wherein the volatile substances (vapors) are allowed to vent from the press barrel at a location where vapor pressure against the rotary seal of the press shaft is kept at an acceptably low value. Furthermore, the operation of the screw member is utilized to clear the venting section of small particles of the material which might be carried through the venting system by the escaping vapor, and to move the particles of the material back into the main stream of the material being processed through the press barrel. The arrangement involves an inlet for volatile containing material which is located somewhat upstream from the inlet to the screw member of the press. Thus, the screw extends into a venting section toward which the volatilizable substances can flow in the form of gas or vapor under pressure.

Near the intersection of the inlet with this venting section, a breaker bar is provided cooperating with the vent control section of the screw member which operates within the venting section of the press barrel. This breaker bar functions to strip any material collecting on the press shaft or passing back along the screw flight, and assures that this material is forced by action of the rotating screw back into the main stream of the material entering the inlet. A vent pipe is connected to the venting section of the barrel, preferably to its top, and this pipe is of a size sufficient to conduct away the gas or vapor under pressure. This vent is located adjacent the shaft rotary seal, preventing build-up of any substantial pressure against the seal which is mounted at this end of the press barrel, surrounding the screw shaft and the part of such shaft which extends outwardly of the press to the drive for the screw.

BRIEF DESCRIPTION OF THE DRAWING

FIG. 1 is a schematic representation of a multisection screw press apparatus; and FIG. 2 is a detail view of one machine of the apparatus, showing the vent arrangement of the invention.

DESCRIPTION OF THE PREFERRED EMBODIMENT

FIG. 1 shows in diagrammatic fashion the arrangement of a screw press apparatus involving three screw press machine sections P-1, P-2 and P-3. The internal details of one of these presses, P-2, are shown in FIG. 2 which is a horizontal cross sectional view, looking from the top of the press, with the screw member shown in elevation. The general construction of the presses is as described in greater detail in the aforementioned U.S. Pat. No. 3,684,252. The arrangement shown in FIG. 1 is a system utilized for removing volatile solvent substances from a synthetic polymer material. However, the invention of this application is applicable to presses used to remove all types of volatilizable substances, including water, water vapor, and the like.

Referring to FIG. 1, the material containing the volatilizable substance is admitted into the press P-1 through the hopper 10. This press is driven by a motor and gear box shown schematically at M-1. The discharge of the press P-1 is into the inlet fitting of the press P-2, this fitting being shown generally at 12 (FIG. 2) and incorporating the bushing 14 which is intended to receive the free end of the screw member in the press P-1. This screw member is comparable to the exposed end of the screw member shown at the discharge of the machine in FIG. 2.

In the particular embodiment illustrated the inlet fitting 12 is provided extending to one side of the barrel or housing 15 of the press, and the screw member is illustrated as incorporating a feed screw section 20, a vent section 22, a working section 24 which comprises a sequence of interrupted screw flights 16, some of which may be notched, and collars 17 located between flight sections. Some of these collars may be tapered, such as collar 28, to provide a transistion between the bodies of the screw flight sections of increasing diameter, as illustrated, and breaker bars 18 extend from the inner wall of the barrel toward these collars.

An adjustable ring or choke member 25 is mounted downstream of this latter section surrounding a conveyor screw section 26 which extends through the longitudinally adjustable ring 25. The tapered collar 28 on the screw member cooperates with the downstream end of the adjustable ring 25 to pass the material as a relatively thin cylindrical "tube" of material which progresses into the final flight 30 of the screw member, this flight extending outward from the discharged end bushing 32 as shown. In the case of the press P-2 the flight 30 can extend into a bushing, comparable to bushing 14, at the inlet of the press P-3.

The press P-2 is driven by the motor and gear box M-2, and the press P-3 is driven by the motor and gear box M-3. The presses P-2 and P-3 differ somewhat from those shown in U.S. Pat. No. 3,684,252, in that the vent sections described in that patent are omitted. In press P-2 this is replaced by non-vented barrel or cage walls, and in the case of the press P-3 a special screw vent 35 is provided, details of this mechanism being disclosed in copending application Ser. No. 856,103 filed concurrently herewith.

It should be noted that the cylindrical press housing or barrel extends in a direction opposite or upstream from the inlet fitting 12, thus incorporating a venting section 40 within which the vent control section 22 of the screw member operates. A pair of breaker bars 42 are mounted between the feed screw 20 and the vent screw flight 22. At the end of the press housing or barrel there is a mechanical seal 45, which may be of a commercially available type, and may incorporate an oil seal structure (not shown) to form a tightly sealed rotary fitting around the shaft of the screw member, with the driven end of the shaft shown at 46 projecting from the seal 45.

In operation, the material containing a vaporizable substance, along with some vapors released in the press P-1, are fed into the inlet fitting 12, picked up by the feed flight 20, thence carried through the press from the inlet out through the discharge at the bushing 32. The polymer and solvent solution is mechanically worked under pressure up to the orifice 28. The sharp pressure reduction which occurs in the screw section 30 allows the volatile solvent to flash vaporize. The vaporize solvent flows concurrently with the polymer in the direction of lesser pressure. The polymer is moved concurrently with vapor by action of the screw section 30 forward toward the next section of the apparatus. The pieces of polymer in the screw section 30 which are of varying size, created by the sudden vaporization of solvent at the orifice 28, tend to reagglomerate and form larger pieces. These larger pieces are more easily conveyed by the screw, but are less likely to be mechanically conveyed by the vapor to their large mass. The mixture of reagglomerated polymer and vapor enters the inlet of the next screw machine, for example, the inlet 12, and there the vapor flows in the direction of the lesser pressure to the venting section 40. The polymer is moved in the opposite direction by the action of the screw section 20. The space between the venting section worm body and the walls of the venting section is made rather large, in order to maximize the cross sectional area of the channel and to minimize vapor velocity in this section and to allow for a relatively free flow of the vapor at relatively low velocity. This in turn tends to minimize the entrainment of the particles of the material in the vapor flow. Any tendency for these particles of the somewhat sticky polymer, to attach to the screw member shaft, to build up therein, and/or to migrate backward into the vent section, is minimized by the interaction of the breaker bars 42 and the rotating flight of the vent screw section 22. The breaker bars tend to clean any such material from the shaft, and causes it to be pushed back into the mainstream of the material past breaker bars.

In one successful embodiment the venting section 40 is about ten inches in length, and receives vent worm flight 22 of fourteen inches outer diameter having an eight inch pitch and a shaft or body diameter of eight inches. The flight 22 makes approximately one full wrap around the body within the vent section.

This minimizes the amount of material which may tend to migrate into, or collect within, the venting section 40. From the venting section, preferably from the top in order to minimize entrainment of any particles which might migrate this far, there is a vent pipe 50 which is used to conduct away the vapors from the vent section. This pipe preferably is rather large in diameter, one successful embodiment utilizing pipe of four inch inner diameter in a venting section where the outer diameter of the screw flight is fourteen inches. This again provides for free flow of the vapors out of the press, and maintains a relatively low pressure in the venting section 40, although still sufficient to assure that there is an outflow of the vapors. Preferably the vent pipe 50 has its opening through the press barrel or housing located close to the seal 45, thereby assuring that vapor pressure does not reach a magnitude where vapors might force through the seal, damaging it, or in the case of flammable vapors, creating a dangerous leakage in the region surrounding the press drive.

The press P-3 may be equipped with a similar venting section and vent pipe, shown generally at 52 in FIG. 1, but details of this arrangement are not repeated since they are essentially a duplicate of those shown in FIG. 2 with respect to the inlet, the venting section, and the vent pipe of the press.

While the form of apparatus herein described constitutes a preferred embodiment of this invention, it is to be understood that the invention is not limited to this precise form of apparatus, and that changes may be made therein without departing from the scope of the invention.

What is claimed is:

1. In apparatus for devolatilizing materials such as solvent containing polymers, the combination of
    a cylindrical housing having inlet and discharge ends,
    a screw member rotatably mounted in said housing and operative to work material so as to release contained vaporizable substances from the material, an inlet fitting at the inlet end of said chamber located opposite a part of said screw member, said housing including a venting section extending therefrom at said inlet end, said screw member having a screw vent section extending within said venting section, and arranged to convey material toward said discharge end, a vent pipe connected to said venting section for conducting away vaporized substances released from the material, breaker means cooperating with said vent section of said screw member to clean from said screw member material tending to cling thereto and to clog the passage between said venting section and said screw vent section.

2. Apparatus for devolatilizing materials, comprising a cylindrical housing having inlet and discharge ends, p1 a screw member rotatably mounted in said housing and operative to work material so as to release contained vaporizable substances from the material, an inlet fitting at the inlet end of said chamber located opposite a part of said screw member, said housing including a venting section extending coaxially therefrom at said inlet end, said screw member having a screw vent section as a continuation thereof extending within said venting section, and arranged to convey material toward said discharge end, said screw member having a drive shaft extending from said housing at the end of said venting section, a seal fixed to said housing and surrounding said drive shaft, a vent pipe connected to the top of said venting section for conducting away vaporized substances released from the material, and breaker means cooperating with said vent section of said screw member to clean from said screw member material tending to cling thereto and to return such material into the flow thereof through said housing.

3. Apparatus as defined in claim 2, wherein said pipe opens into said venting section adjacent said seal.

* * * * *

UNITED STATES PATENT AND TRADEMARK OFFICE
CERTIFICATE OF CORRECTION

PATENT NO. : 4,124,306
DATED : Nov. 7, 1978
INVENTOR(S) : D. K. Bredeson; G. C. Craig; W. J. Gilius; C. R. Johnson It is certified that error appears in the above–identified patent and that said Letters Patent are hereby corrected as shown below:

Assignee:   The French Oil Mill Machinery Company, Piqua, Ohio and

The Firestone Tire & Rubber Company, Akron, Ohio

Signed and Sealed this

Fifteenth Day of May 1979

[SEAL]

Attest:

RUTH C. MASON
*Attesting Officer*

DONALD W. BANNER
*Commissioner of Patents and Trademarks*